United States Patent [19]

Huang

[11] Patent Number: 5,676,386
[45] Date of Patent: Oct. 14, 1997

[54] STROLLER IN COMBINATION WITH A SAFETY SEAT ASSEMBLY

[76] Inventor: Li-chu Chen Huang, No. 9, Alley 2, Lane 606, Sec. 2, Po Ai Rd., Chia Yi City, Taiwan

[21] Appl. No.: 550,411

[22] Filed: Oct. 30, 1995

[51] Int. Cl.$^6$ .................. B62B 7/04; B60N 2/28
[52] U.S. Cl. .............. 280/30; 280/643; 280/650; 280/47.38; 297/256.16
[58] Field of Search .................. 280/30, 642, 643, 280/647, 650, 47.35, 47.38, 47.36, 47.4, 648; 297/250.1, 252, 253, 256.16, 256.17

[56] References Cited

U.S. PATENT DOCUMENTS

| | | | |
|---|---|---|---|
| 1,289,477 | 12/1918 | Koster | 297/250.1 |
| 4,679,806 | 7/1987 | Gingline | 280/47.38 |
| 4,750,783 | 6/1988 | Irby et al. | 297/256.16 |
| 4,768,795 | 9/1988 | Mar | 280/30 |
| 4,861,105 | 8/1989 | Merten et al. | 297/256.17 |
| 5,056,865 | 10/1991 | Sedlack | 297/256.17 |
| 5,257,799 | 11/1993 | Cone et al. | 280/47.36 |
| 5,265,931 | 11/1993 | Ryan | 297/250.1 |
| 5,385,386 | 1/1995 | Beamish et al. | 297/256.16 |
| 5,385,387 | 1/1995 | Kain | 297/256.16 |
| 5,431,478 | 7/1995 | Noonan | 297/256.16 |
| 5,499,831 | 3/1996 | Worth et al. | 280/30 |

FOREIGN PATENT DOCUMENTS 2193692  2/1988  United Kingdom ............ 280/47.38

Primary Examiner—Brian L. Johnson
Assistant Examiner—Min Yu
Attorney, Agent, or Firm—Hedman, Gibson & Costigan, P.C.

[57] ABSTRACT

A safety seat assembly is assembled with a stroller. The safety seat assembly includes a base member having two ears each formed on one end portion thereof and each having a notch laterally defined therein for receiving a bar of the armrest of the stroller therein. A retaining block is formed on the base member and located between the two ears. A passage is defined in and a boss is formed on an inner wall of the retaining block. A sliding lever is slidably mounted on the retaining block. A flange portion is formed on a mediate portion of the sliding lever and is slidably mounted in the passage. A stub is formed on the flange portion. A stop is formed on one end portion of the sliding lever and is detachably received in a recess of the bar of the armrest of the stroller. A biasing member is mounted in the passage and has a first distal end fixedly attached to the boss and a second distal end fixedly attached to the stub.

3 Claims, 7 Drawing Sheets

STROLLER IN COMBINATION WITH A SAFETY SEAT ASSEMBLY

BACKGROUND OF THE INVENTION

1. Field of Invention

The present invention relates to a stroller in combination with a safety seat assembly.

2. Related Prior Art

Parents usually have to place infants or babies on a safety seat such as the "Evenflo" infant car seat when going outdoors. However, the total weight of the infant together with the safety seat easily cause a great burden to the parents. In addition, such a car seat for babies is not suitable for infants who require more space. On the other hand, a conventional stroller is suitable for infants only and is not suitable for babies to be seated thereon.

The present invention has arisen to mitigate and/or obviate disadvantages of the conventional stroller and safety seat.

SUMMARY OF THE INVENTION

In accordance with one aspect of the present invention, there is provided a stroller in combination with a safety seat assembly.

The stroller includes a substantially U-shaped armrest having two parallel arms and a bar mounted therebetween, and a recess laterally defined in the bar.

The safety seat assembly comprises a base member having a first end portion and a second end portion. Two ears are each formed on the first end portion of the base member and each have a notch laterally defined therein for receiving the bar therein. An opening is defined in the base member and located between the two ears.

A retaining block is formed on the base member and located in the opening between the two ears. A passage is defined in an inner wall of the retaining block and communicates with the opening. A boss is formed on the inner wall of the retaining block and faces the passage.

A sliding member is movably mounted in the base member and includes a sliding lever slidably mounted between the two ears and having a first end portion, a mediate portion and a second end portion. A flange portion is formed on an upperside of the mediate portion of the sliding lever to move therewith and is slidably mounted in the passage. A stub is formed on the flange portion and faces the boss. A stop is formed on the second end portion of the sliding lever and is detachably received in the recess of the bar of the armrest of the stroller.

A biasing member is mounted in the passage and includes a first distal end fixedly attached to the boss and a second distal end fixedly attached to the stub. A positioning member is mounted on an underside of the base member for fastening the sliding member in the base member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
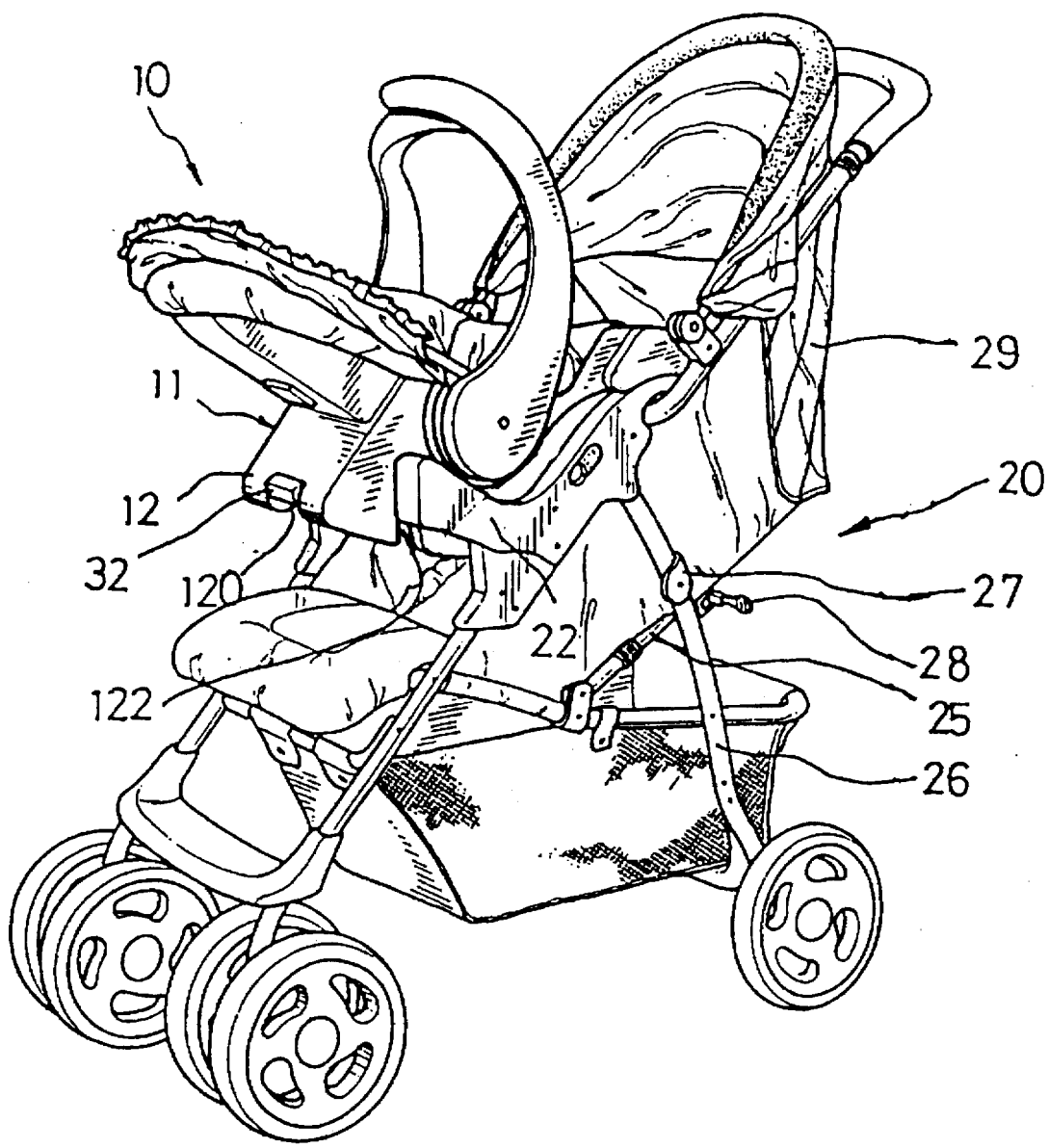
FIG. 1 is a perspective view of a safety seat assembly in combination with a stroller in accordance with the present invention.

Referring to the drawings, and initially to FIGS. 1-4, a stroller 20 in accordance with the present invention is adapted to be assembled with a safety seat assembly 10.

The stroller 20 includes a substantially U-shaped armrest 21 having two parallel arms 22 and a bar 23 mounted therebetween. A recess 230 is laterally defined in the bar 23.

The safety seat assembly 10 comprises a base member 11 having a first end portion and a second end portion. Two ears 12 are each formed on an underside of the first end portion of the base member 11 and each have a notch 122 laterally defined therein for receiving the bar 23 therein, An opening 120 is defined in the base member 11 and located between the two ears 12. A retaining block 13 is formed on the base member 11 and located in the opening 120 between the two ears 12. A passage 130 is defined in an inner wall 136 of the retaining block 13 and communicates with the opening 120. A boss 14 is formed on the inner wall 136 of the retaining block 13 and faces the passage 130.

A sliding member 30 is movably mounted in the underside of the base member 11 and includes a sliding lever 31 slidably mounted in the opening 120 between the two ears 12 of the base member 11 and having a first end portion, a mediate portion and a second end portion.

A large head 32 is formed on the first end portion of the sliding member 30 and extends outwardly from the two ears 12 of the base member 11. Preferably, a socket 320 is defined in an underside of the large head 32.

A flange portion 33 is formed on an upperside of the mediate portion of the sliding lever 31 to move therewith and is slidably mounted in the passage 130 of the retaining block 13. A stub 330 is formed on the flange portion 33 and faces the boss 14.

Figure 4:
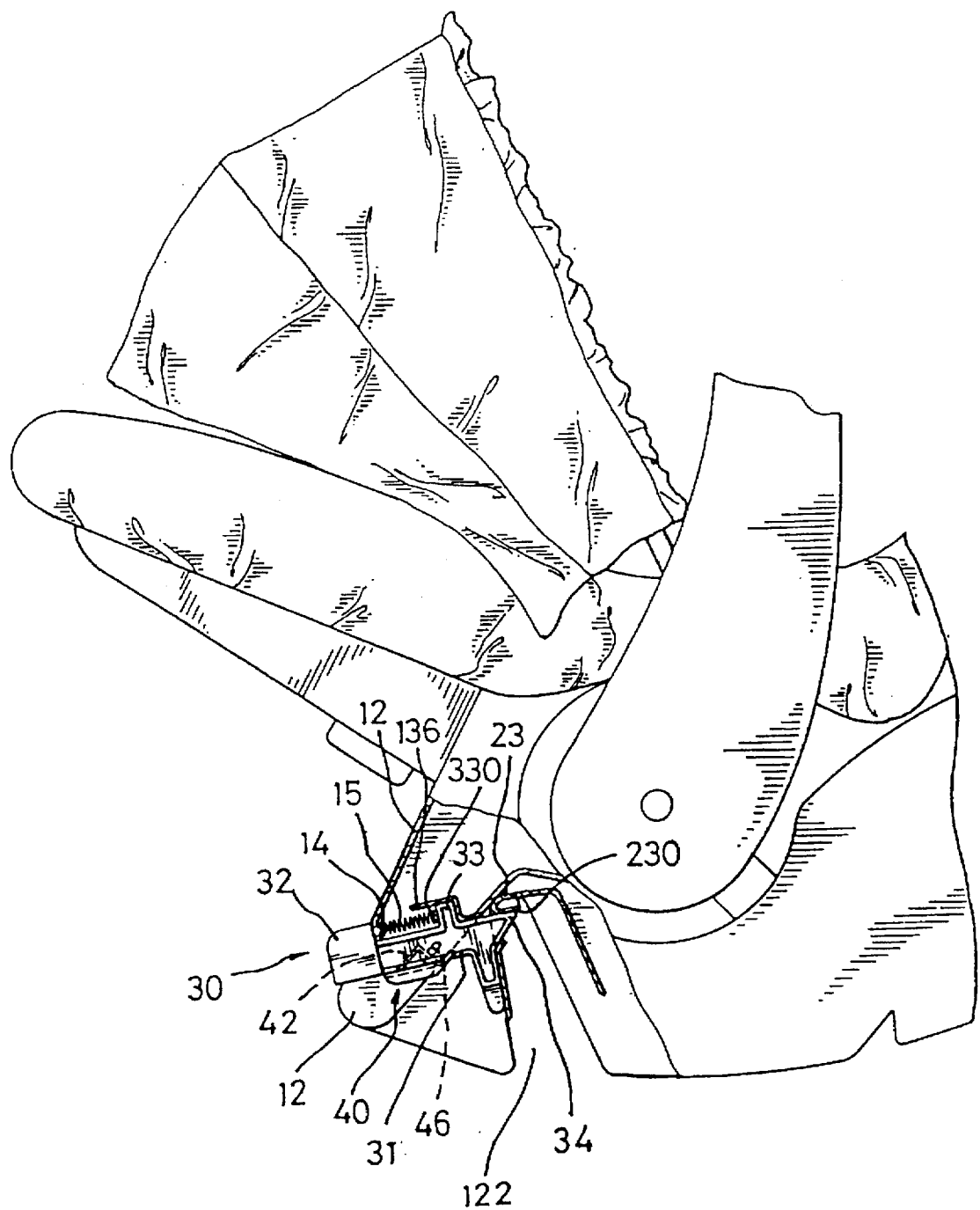
FIG. 4 is a side cross-sectional assembly view of the safety seat assembly.

A biasing member 15 such as a spring is mounted in the passage 130 and includes a first distal end fixedly attached to the boss 14 and a second distal end fixedly attached to the stub 330 such that the flange portion 33 of the sliding lever 31 is urged to slide in the passage 130 by means of the spring 15. It is to be noted that the movement of the flange portion 33 is stopped by the inner wall 136 of the retaining block 13 as shown in FIG. 4.

A stop 34 is formed on the second end portion of the sliding lever 31 and is detachably received in the recess 230 of the bar 23 of the armrest 21 of the stroller 20.

A positioning member 40 is securely mounted on an underside of the base member 11 for fastening the sliding member 30 in the base member Preferably, two wedge-shaped cavities 131 are each defined in an underside of the retaining block 13 and are each located adjacent to the passage 130. Two bores 132 are each defined in the underside of the retaining block 13 and each communicate with a corresponding one of the two cavities 131.

There are two wedges 42 each formed on and protruding from an upperside of the positioning member 40 and each rested against the underside of the retaining block 13 and each received in a corresponding one of the two cavities 131.

Each of the two wedges 42 has a through hole 44 defined therein and communicating an associated bore 132.

Two positioning screws 46 each extend through a corresponding one of the two through holes 44 and are each threadedly engaged in an associated bore 132, thereby fastening the sliding lever 31 in the base member 11.

Figure 2:
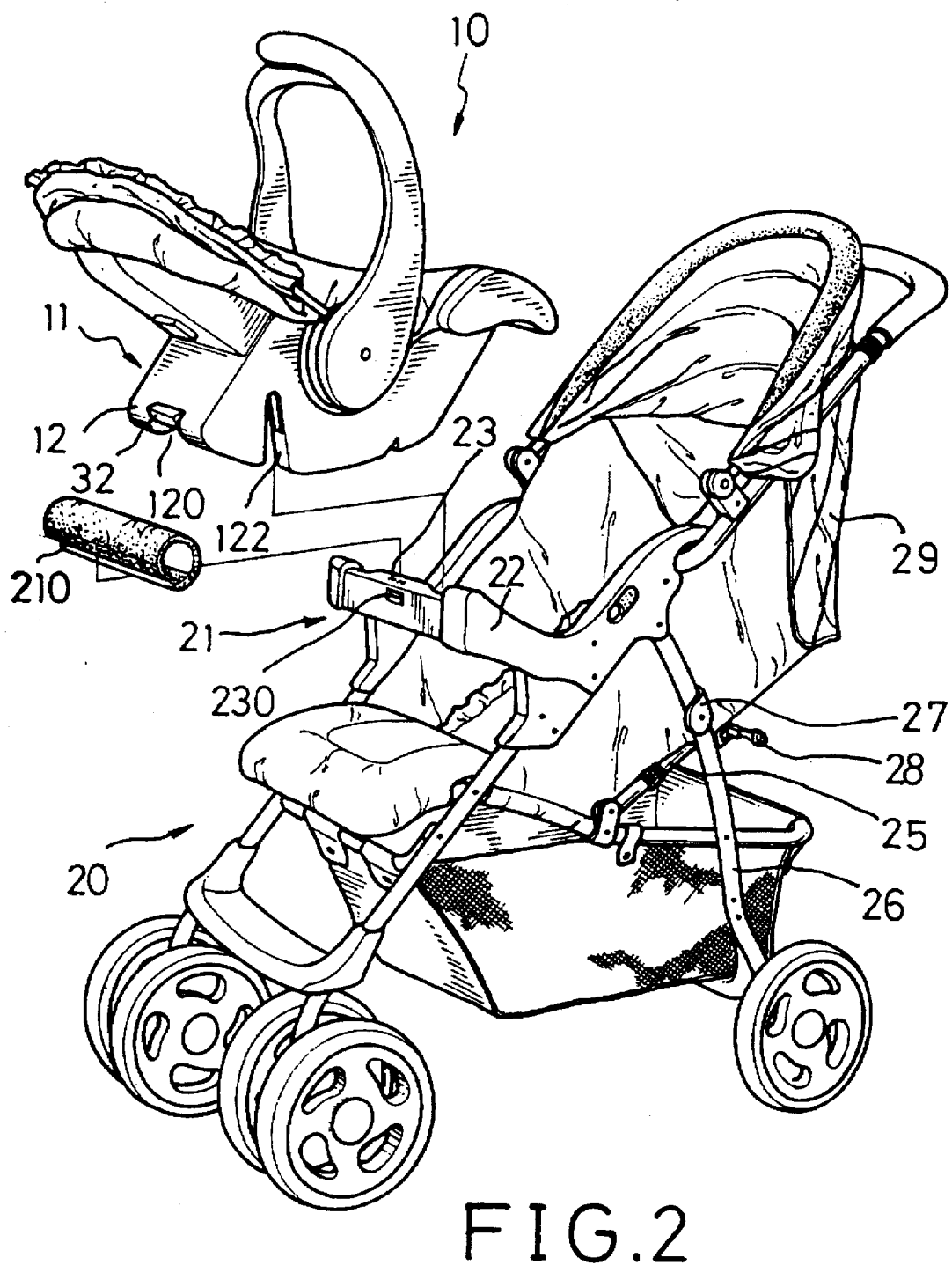
FIG. 2 is a perspective dismantled view of FIG. 1.
Figure 3:
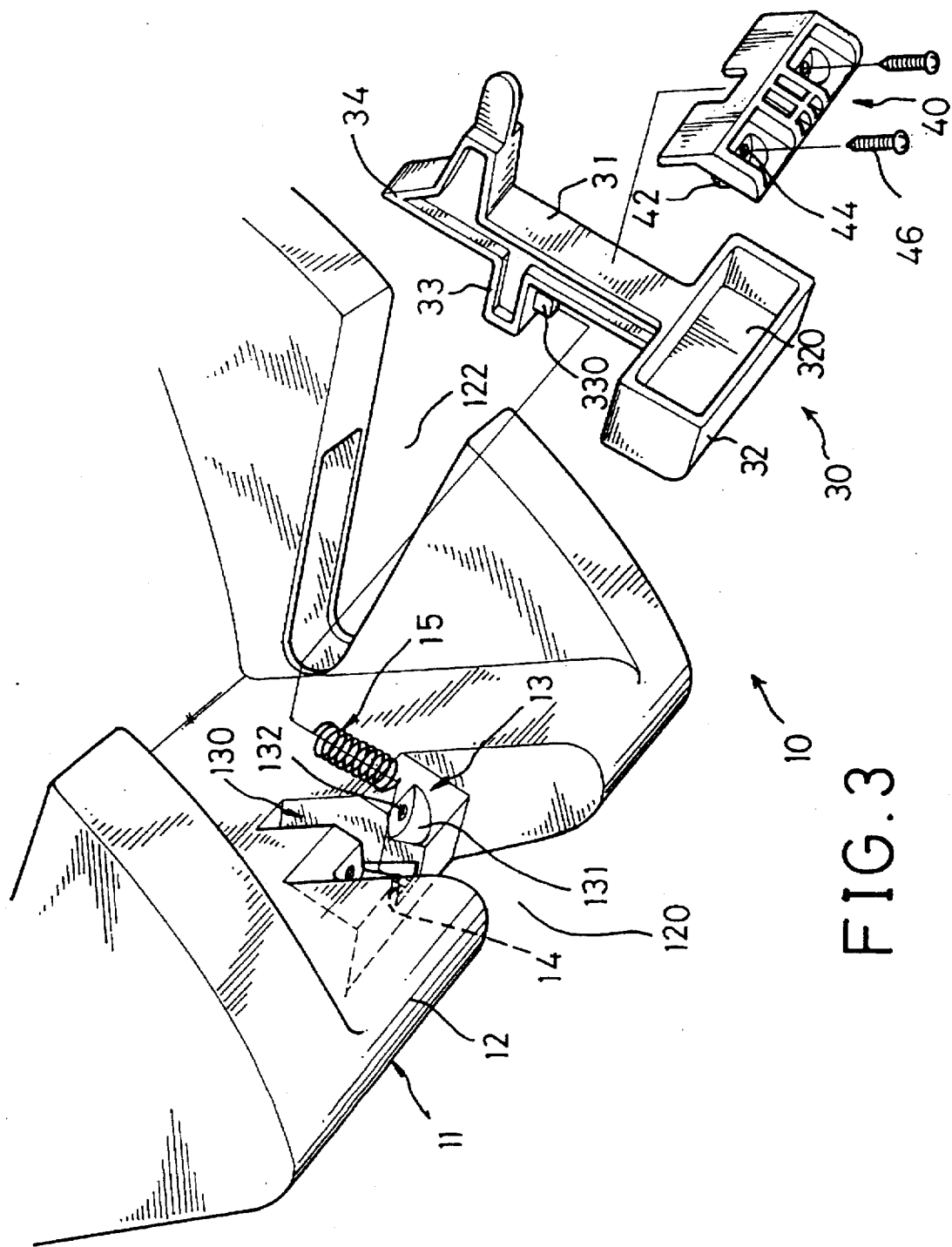
FIG. 3 is a bottom exploded view of the safety seat assembly.
Figure 5:
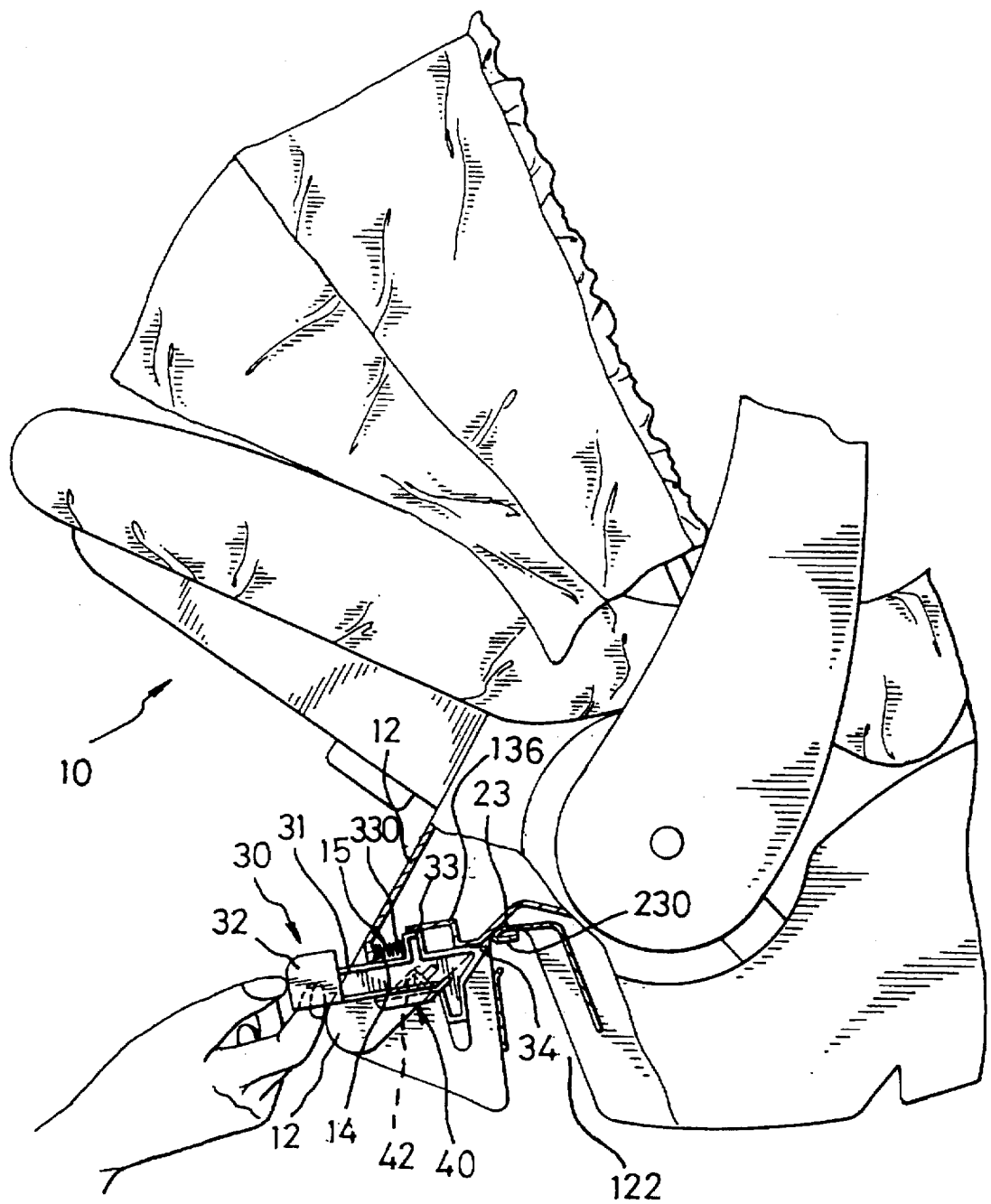
FIG. 5 is an operational view of FIG. 4.

In operation, referring to FIGS. 4 and 5 with reference to FIGS. 1–3, the safety seat assembly 10 can be fitted on the armrest 21 of the stroller 20 with the bar 23 of the armrest 21 being received in the notches 122 of the base member 11 while the stop 34 of the sliding lever 31 is received in the recess 230 and rested against an inner side of the bar 23 by means of the spring 15 imposing an urging force on the flange portion 33 of the sliding lever 31 as shown in FIG. 4, thereby securing the base member 11 of the safety seat assembly 10 on the armrest 21 of the stroller 20, best shown in FIG. 1.

A user can pull the sliding member 30 outward by means of his/her finger being received in the socket 320 of the large head 32 such that the sliding lever 31 can be drawn outward relative to the bar 23, thereby releasing the stop 34 from the recess 230 of the bar 23 as shown in FIG. 5 such that the base member 11 of the safety seat assembly 10 can be disengaged with and detached from the armrest 21 of the stroller 20, as best shown in FIG. 2. Preferably, a tubular pad 210 (see FIG. 2) can be mounted around the bar 23 when the safety seat assembly 10 is removed from the armrest 21 of the stroller 20.

Figure 6:
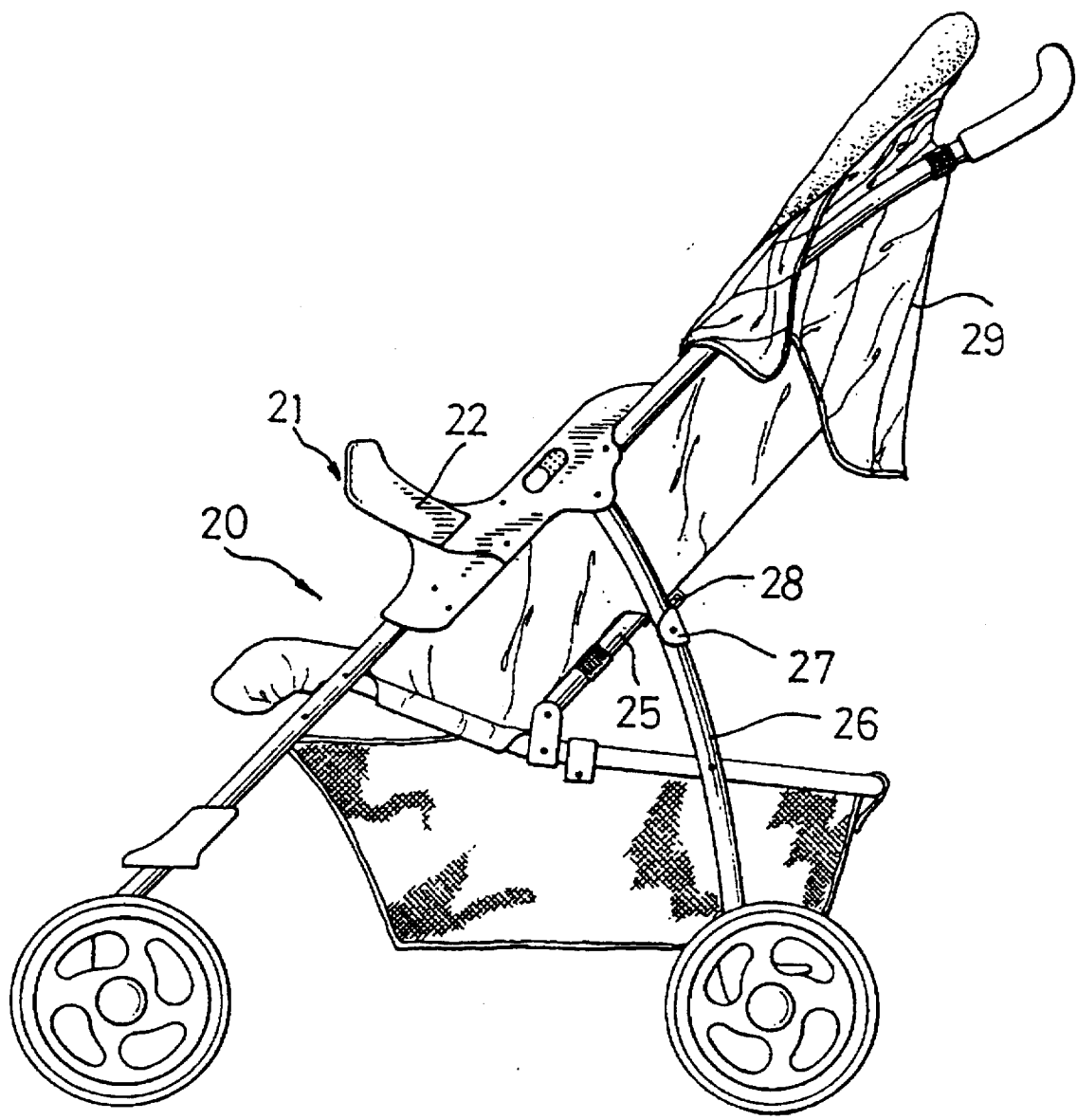
FIG. 6 is a side view of the stroller.
Figure 7:
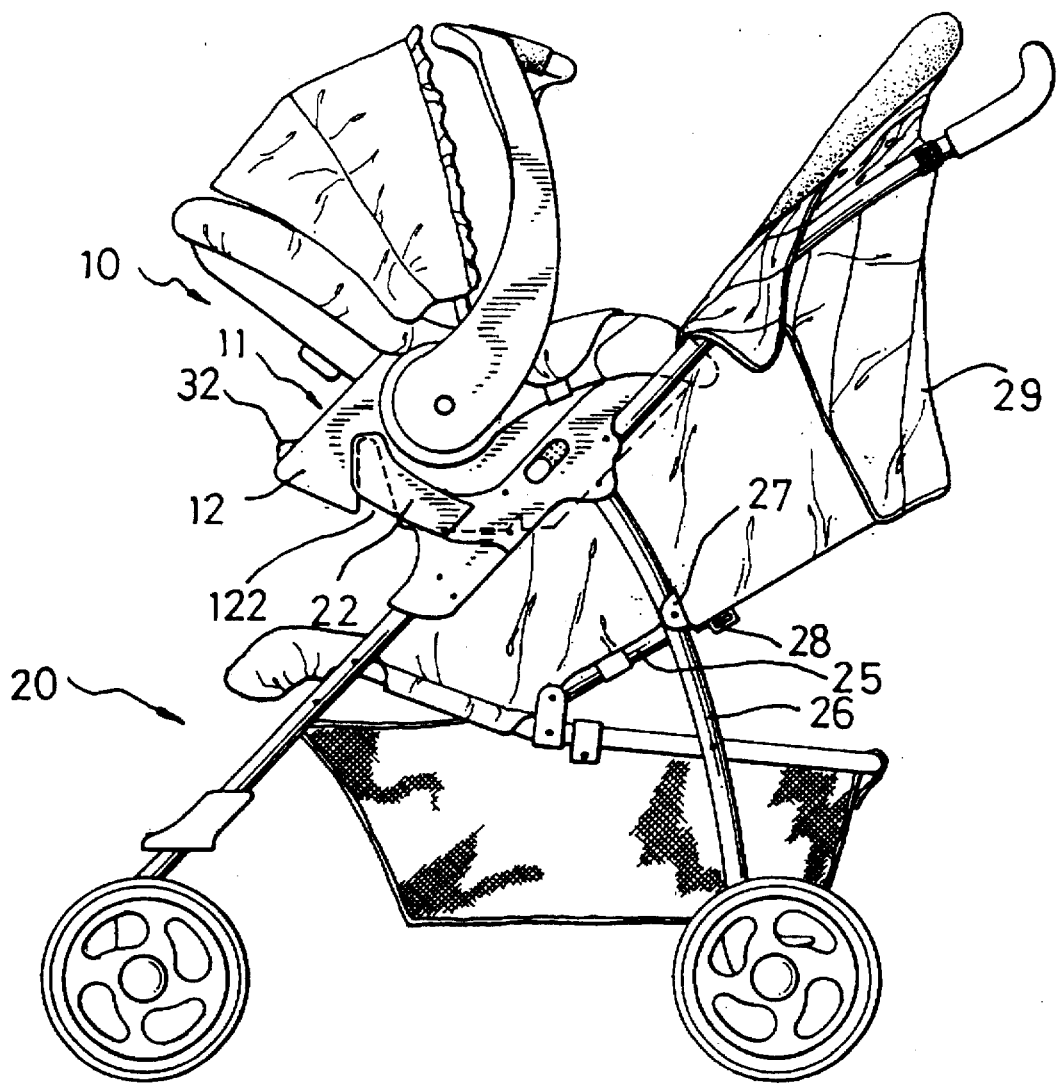
FIG. 7 side view of FIG. 1.

Referring to FIGS. 6 and 7 with reference to FIGS. 1 and 2, the stroller 20 includes a pair of rear stands 26 and a pair of backrest stands 25 each pivotally engaged with each other. A shield 29 encompasses the two backrest stands 25. Each of the two backrest stands 25 has a control switch 28 mounted thereon and each of the two rear stands 26 has a catch 27 fixedly mounted thereon.

The control switches 28 are initially retained on an upper portion of the associated catches 27 such that the two backrest stands 25 together with the shield 29 are disposed in a folded status as shown in FIG. 6.

The control switches 28 can be detached from the associated catches 27 such that the two backrest stands 25 together with the shield 29 are disposed in an expanded status as shown in FIG. 7. In such a situation, the base member 11 of the safety seat assembly 10 can be fitted on the armrest 21 of the stroller 20.

Accordingly, by such an arrangement, the stroller 20 in combination with the safety seat assembly 10 is suitable for babies who cannot sit on the stroller 20 by means of the safety seat assembly 10 being fitted on the armrest 21 of the stroller 20 such that the baby can be seated on the safety seat assembly 10 and is suitable for infants who can sit on the stroller 20 by means of the safety seat assembly 10 being disengaged with and detached from the armrest 21 of the stroller 20.

Preferably, the safety seat assembly 10 can be in the form of an "Evenflo" infant car seat.

It should be clear to those skilled in the art that further embodiments of the present invention may be made without departing from the teachings of the present invention.

What is claimed is:

1. A safety seat assembly in combination with a stroller which includes a seat for holding a child and a substantially U-shaped armrest having two parallel arms and a bar mounted therebetween, a recess laterally defined in one side of said bar, said safety seat assembly comprising:

a base member having a first end portion and a second end portion, two ears each formed on the first end portion of said base member and each having a notch laterally defined therein for receiving said bar therein, an opening defined in said base member and located between said two ears, a retaining block formed on said base member and located in said opening between said two ears, a passage defined in an inner wall of said retaining block and communicating with said opening, a boss formed on the inner wall of said retaining block and facing said passage;

a sliding member movably mounted in said base member and including a sliding lever slidably mounted between said two ears and having a first end portion, a mediate portion and a second end portion, a flange portion formed on an upperside of the mediate portion of said sliding lever to move therewith and slidably mounted in said passage, a stub formed on said flange portion and facing said boss, a stop formed on the second end portion of said sliding lever and detachably received in said recess of said bar;

a biasing member mounted in said passage and having a first distal end fixedly attached to said boss and a second distal end fixedly attached to said stub; and a positioning member mounted on an underside of said base member for fastening said sliding member in said base member.

2. The safety seat assembly in combination with a stroller in accordance with claim 1, wherein a large head is formed on the first end portion of said sliding member and extending outward of said two ears of said base member, and a socket defined in an underside of said enlarged head.

3. The safety seat assembly in combination with a stroller in accordance with claim 1, wherein the movement of said flange portion is stopped by the inner wall of said retaining block.

* * * * *